(12) United States Patent
Yu

(10) Patent No.: US 9,823,056 B2
(45) Date of Patent: Nov. 21, 2017

(54) MEASURING TOOL

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventor: De Yu, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 247 days.

(21) Appl. No.: 14/803,908

(22) Filed: Jul. 20, 2015

(65) Prior Publication Data

US 2016/0123714 A1 May 5, 2016

(30) Foreign Application Priority Data

Nov. 3, 2014 (CN) .......................... 2014 1 0610541

(51) Int. Cl.
*G01B 5/14* (2006.01)

(52) U.S. Cl.
CPC ..................... *G01B 5/14* (2013.01)

(58) Field of Classification Search
CPC ... G01B 5/14; G01B 3/26; G01B 3/30; G01B 3/22; G01B 3/46; G01B 3/50
USPC .................... 33/544.4, 501.45, 613
See application file for complete search history.

(56) References Cited

U.S. PATENT DOCUMENTS

| | | | | |
|---|---|---|---|---|
| 2,470,755 A | * | 5/1949 | Hamilton ................. | G01B 5/08 33/501.45 |
| 2,577,262 A | * | 12/1951 | Meuller ................... | G01B 5/12 33/501.45 |
| 2,579,386 A | * | 12/1951 | Koenig .................... | G01B 3/30 33/562 |
| 2,715,281 A | * | 8/1955 | Black ....................... | G01B 5/08 33/501.45 |

(Continued)

FOREIGN PATENT DOCUMENTS

| | | |
|---|---|---|
| CN | 101118144 A | 2/2008 |
| CN | 201955045 U | 8/2011 |

(Continued)

OTHER PUBLICATIONS

1st office action issued in corresponding Chinese application No. 201410610541.6 dated Jul. 29, 2016.

*Primary Examiner* — Christopher Fulton
(74) *Attorney, Agent, or Firm* — Nath, Goldberg & Meyer; Joshua B. Goldberg

(57) ABSTRACT

The present invention provides a measuring tool comprising a support portion and a measuring portion, the measuring portion is movably connected to the support portion, the support portion is configured for supporting the measuring portion, the measuring portion is configured for successively measuring at least one gap between a base and a workpiece on the base. The measuring tools, by providing a measuring portion capable of successively measuring at least one gap between the rubbing base and the rubbing roller, avoid frequent replacement of the measuring portion, thereby the measuring efficiency is increased greatly, and the utilization rate of processing equipment is improved.

13 Claims, 2 Drawing Sheets

(56) References Cited

U.S. PATENT DOCUMENTS

| | | | | |
|---|---|---|---|---|
| 4,419,829 A * | 12/1983 | Miller | ............... | G01B 3/002 |
| | | | | 33/501.08 |
| 4,813,152 A * | 3/1989 | Spencer | ............... | G01B 5/14 |
| | | | | 33/638 |
| 5,042,161 A * | 8/1991 | Hodge | ............... | A61B 5/1076 |
| | | | | 33/501.45 |
| 5,471,756 A * | 12/1995 | Bolanos | ............... | A61B 5/1076 |
| | | | | 33/501.45 |
| 5,768,794 A * | 6/1998 | Kelly | ............... | G01B 3/46 |
| | | | | 33/531 |
| 5,777,246 A | 7/1998 | Woods et al. | | |
| 7,383,639 B2 * | 6/2008 | Malandain | ............... | A61B 1/3135 |
| | | | | 33/512 |
| 7,430,813 B2 * | 10/2008 | Park | ............... | B60J 10/00 |
| | | | | 33/542 |
| 9,255,779 B2 * | 2/2016 | Laflen | ............... | G01B 5/14 |
| 2013/0168364 A1 * | 7/2013 | Ketelaar | ............... | G01B 1/00 |
| | | | | 219/69.17 |

FOREIGN PATENT DOCUMENTS

| | | |
|---|---|---|
| CN | 202547559 U | 11/2012 |
| CN | 203572401 U | 4/2014 |

* cited by examiner

MEASURING TOOL

FIELD OF THE INVENTION

The present invention relates to the technical field of display manufacturing, and particularly to a measuring tool.

BACKGROUND OF THE INVENTION

The rubbing process in the coupling and alignment process of the liquid crystal panel is also known as rubbing orientation. Typically materials such as nylon, fibers or cotton are used to rub the orientation films on the surfaces of the array substrate and the color filter substrate so as to change the surface state of the orientation films, thereby the liquid crystal molecules can be arranged uniformly with certain pre-tilt angle between the array substrate and the color filter substrate. The orientation quality has a significant impact on the basic properties of the liquid crystal display such as display uniformity, viewing angle, color difference, response speed, threshold voltage and the like.

The traditional process for forming an orientation film includes placing the array substrate or the color filter substrate to be oriented on a rubbing base, wrapping a rubbing cloth around a rubbing roller, rotating the rubbing roller to rub the rubbing cloth on the surface of the orientation film so as to form the orientation grooves (i.e. change the surface state of the orientation film). The orientation quality is closely related to the shape accuracy, flatness of the rubbing base, the gap accuracy between the rubbing base and the rubbing roller, and so on. The gap accuracy between the rubbing base and the rubbing roller will most affect the pushing amount, torque and other parameters of the rubbing process. Therefore, the gap accuracy between the rubbing base and the rubbing roller is mostly important to the rubbing process, and shall be controlled and measured precisely.

Existing tools for measuring the gap accuracy between the rubbing base and the rubbing roller have components as shown in FIG. 1, include a plug sheet 101 and a plug gauge 103. The plug sheet 101 is a plastic article containing an empty box 102, the length and width of the empty box 102 are the same as that of the plug gauge 103 so that the empty box 102 is just enough to contain the plug guage gauge 103. The thickness and the number of the plug guage 103 can be set according to the specifications of the gap accuracy. Currently, the industry specification of the gap accuracy is usually 3±0.035 mm, therefore the thickness of the plug guage 103 is typically 2.965 mm, 2.975 mm, 2.985 mm, 2.995 mm, 3.005 mm, 3.015 mm, 3.025 mm, 3.035 mm, and also may be 2.96 mm, 2.97 mm, etc. Existing plug guage 103 is a metal article, and its thickness is at least larger than that of the plug sheet 101.

Existing method for measuring the gap is shown in FIG. 2, wherein the plug guage 103 is placed into the empty box 102, then the plug sheet 101 is moved manually to the gap between the rubbing base 5 and the rubbing roller 6, and the size of the gap is measured roughly by using the thickness of the plug guage 103. FIG. 2 shows three cases where, from right to left, the thickness of the plug guage 103 is larger than the gap, the plug guage 103 is just passing through the gap and the thickness of the plug guage 103 is smaller than the gap. Such measurement method is inefficient, the plug guage 103 shall be successively replaced to measure the size of the gap. In existing production line, for example, in order to reflect the gap accuracy between the rubbing base 5 and the rubbing roller 6, the gap values at about 500 positions should be measured. If the plug guage 103 needs to be successively replaced during measurement, it will take too much time and seriously affect the utilization rate of the equipment.

SUMMARY OF THE INVENTION

With respect to above problems in the prior art, the present invention provides a measuring tool. The measuring tool can not only improve the measuring efficiency, but also increases the utilization rate of processing equipment.

The present invention provides a measuring tool comprising a support portion and a measuring portion, the measuring portion is movably connected to the support portion, the support portion is configured for supporting the measuring portion, the measuring portion is configured for successively measuring at least one gap between a base and a workpiece on the base.

Preferably, the support portion includes a support rod, the measuring portion includes a plurality of rolling elements having different diameters respectively, the rolling elements are connected to the support rod, and the rolling elements are capable of rolling on the base.

The rolling elements may be circular plates having different diameters respectively, wherein the center of each circular plate is connected to the support rod.

Alternatively, the rolling elements may be spheres having different diameters respectively, wherein the center of each sphere is connected to the support rod, and the spheres are capable of rotating about their center in any direction.

Preferably, the plurality of rolling elements are arranged along the longitudinal direction of the support rod in a descending or ascending order of their diameters.

Preferably, the centers of the plurality of rolling elements are arranged in a line.

Preferably, the portions of the plurality of rolling elements to be in contact with the base are arranged on a same plane.

Preferably, the diameters of the plurality of rolling elements increase sequentially in a linear manner.

Preferably, the rolling elements are made of rubber or metallic material.

Preferably, the support portion further includes a plurality of rollers, the axes of the roller are connected to the support rod, and the rollers are capable of rotating about their axes respectively.

Preferably, the plurality of rollers are arranged along the longitudinal direction of the support rod with equal intervals, the portions of the rollers to be in contact with the base are arranged on a same plane as the portions of the rolling elements to be in contact with the base.

Preferably, the measuring tool further comprises a push rod, one end of the push rod is movably connected to the end of the support rod closing to a rolling element having the maximum diameter, and the push rod can be elongated or shortened for pushing the support rod to move.

Preferably, one end of the push rod is provided with a first connector, and a second connector is provided at the end of the support rod closing to a rolling element having the maximum diameter, the first connector and the second connector can be interconnected or disconnected.

Preferably, the first connector and the second connector are magnets capable of attracting each other; or the first connector is a hook, and the second connector is a shackle adapted to the hook.

The present invention has the following beneficial effects: in the measuring tool of the present invention, by providing the measuring portion for successively measuring at least one gap between a base and a workpiece on the base, frequent replacement of the measuring portion is no longer required, thereby the measuring efficiency is increased greatly, and the utilization rate of processing equipment is improved.

Figure 1:
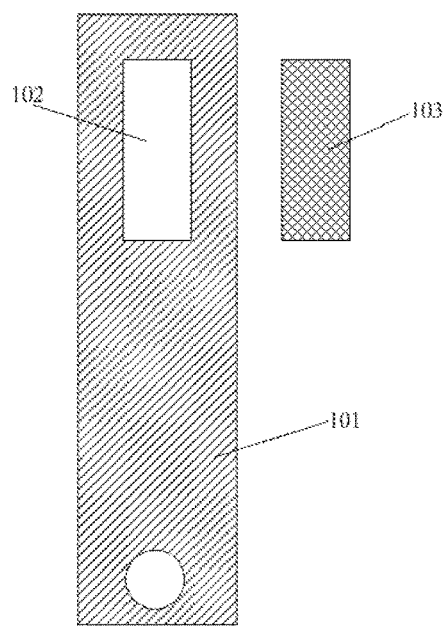
FIG. 1 is a top view of the structure of an existing measuring tool.
Figure 2:
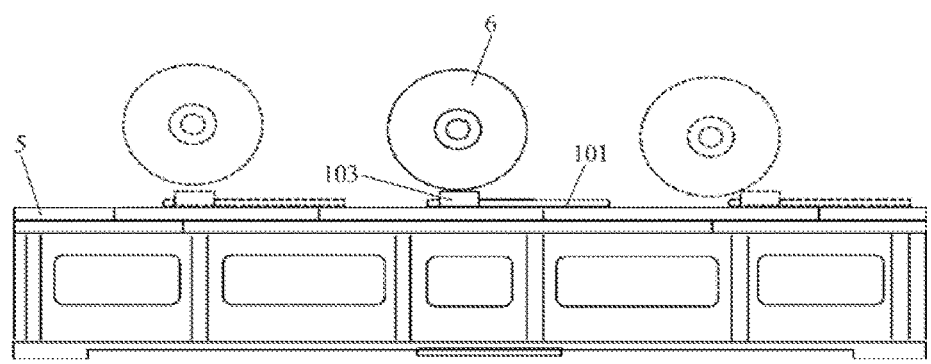
FIG. 2 is a schematic view showing the measurement using the measuring tool in FIG. 1 in prior art.
Figure 3:
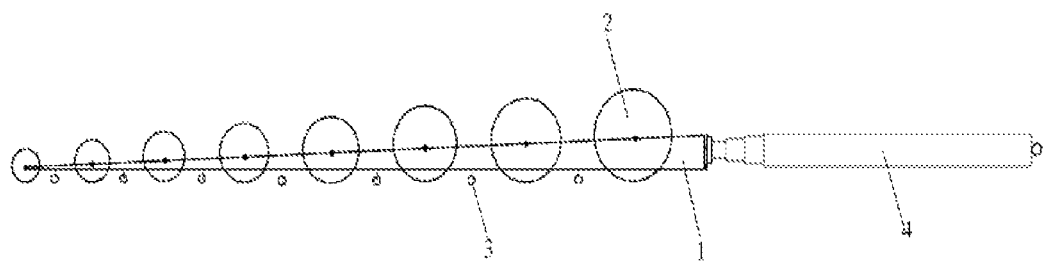
FIG. 3 is a schematic structural view of a measuring tool according to a first embodiment of the present invention.

Reference numerals: 1. support rod; 2. circular plate; 3. roller; 4. push rod; 5. rubbing base; 6. rubbing roller; 101. plug sheet; 102. empty box; 103. plug guage.

DETAILED DESCRIPTION OF THE EMBODIMENTS

For a better understanding of the solutions of the present invention, the specific measuring tool of the present invention will be described in detail below in conjunction with the accompanying drawings and detailed embodiments.

First Embodiment:

The present embodiment provides a measuring tool comprising a support portion and a measuring portion, the measuring portion is movably connected to the support portion, the support portion is configured for supporting the measuring portion, the measuring portion is configured for successively measuring at least one gap between a base and a workpiece on the base.

Figure 4:
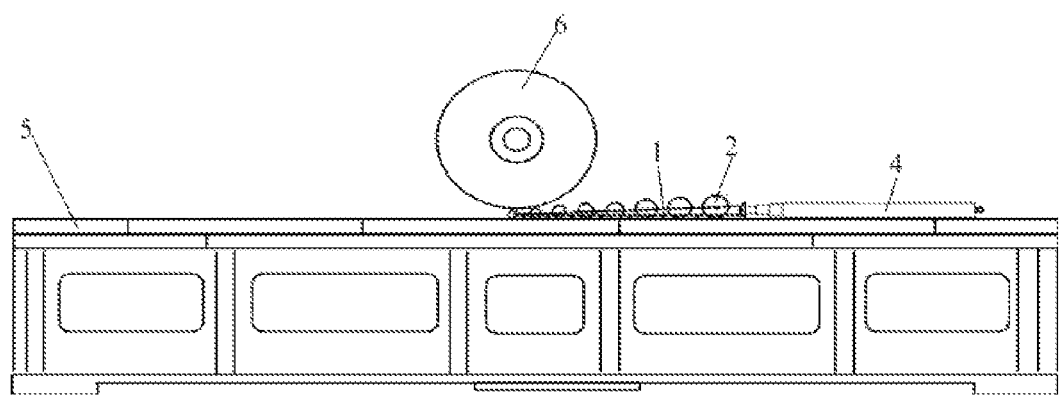
FIG. 4 is a schematic view showing the measurement using the measuring tool in FIG. 3.

As shown in FIG. 4, the base in the present embodiment is the rubbing base 5 for forming the orientation film by rubbing, the workpiece on the base is the rubbing roller 6 for forming the orientation film by rubbing. The measuring tool in the present embodiment is configured for measuring the gap between the rubbing base 5 and the rubbing roller 6.

The measuring portion is capable of successively measuring at least one gap between the rubbing base 5 and the rubbing roller 6. Compared to the prior art, frequent replacement of the measuring portion is no longer required, thereby the measuring efficiency is increased greatly, and the utilization rate of processing equipment is improved.

In the present embodiment, the support portion includes a support rod 1, the measuring portion includes a plurality of circular plates 2 having different diameters respectively, the center of each circular plate 2 is connected to the support rod 1, and the circular plates 2 can rotate about their centers, thus rolling on the rubbing base 5 at their edges. As shown in FIG. 4, during measurement, the plane of the circular plates 2 is perpendicular to the bearing surface of the rubbing base 5 supporting the glass substrate, thus the gaps between the rubbing base 5 and the rubbing roller 6 can be measured by the diameter sizes of the circular plates 2, such that the gaps between the rubbing base 5 and the rubbing roller 6 are measured by using the circular plates 2 having different diameters. The circular plates 2 can roll on the rubbing base 5, thus the plurality of gaps between the rubbing base 5 and the rubbing roller 6 can be measured successively. The rolling friction between the circular plates 2 and the rubbing base 5 is smaller than the sliding friction between the measurement portion in prior art and the rubbing base 5, therefore the wearing of the surface of the rubbing base 5 and damage to the surface of the rubbing roller 6 caused by the measurement portion during measurement are significantly reduced, the accuracy of gap measurement is increased, and the rubbing quality of the orientation film is improved.

The plurality of circular plates 2 are arranged along the longitudinal direction of the support rod 1 in a descending or ascending order of their diameters. The plurality of circular plates 2 are arranged on a same plane, that is, the sides of the plurality of circular plates 2 having large area are placed on a same plane. As such, the gaps between the rubbing base 5 and the rubbing roller 6 can be successively measured by passing the circular plates 2 having different diameters in turn, without the need of frequent measuring using circular plates 2 having different diameters, thereby the measuring efficiency is increased. Moreover, the circular plates 2 are arranged on a same plane, such that when measuring each gap using the circular plates 2, the measurement can be performed by moving the support rod 1 along its longitudinal direction, the circular plates 2 will pass through the gap in sequence of their diameters from small to large. During the measurement, the circular plates 2 do not slide laterally with respect to the rubbing base 5, thus the rubbing base 5 and the rubbing roller 6 can be prevented from wearing.

Note that the circular plates 2 may also be arranged within different planes, that is, the sides of the plurality of circular plates 2 having large area are not placed on a same plane. For example, the odd numbered circular plates 2 have their sides having large area placed on one plane, and the even numbered circular plates 2 have their sides having large area placed on another plane, the entire measuring tool renders a "⊥" or "Z" shape. During measuring, the circular plates 2 having different diameters moves along the longitudinal direction of the support rod 1, while shifting along a lateral direction perpendicular to the longitudinal direction of the support rod 1, thus the circular plates 2 having different diameters can be utilized to measure gaps not arranged in a line. In the present embodiment, the portions of the plurality of circular plates 2 to be in contact with the rubbing base 5 are arranged on a same plane, and the diameters of the plurality of circular plates 2 increase sequentially in a linear manner. During measuring, the gaps between the rubbing base 5 and the rubbing roller 6 are measured by using the diameters of the circular plates 2, therefore the accuracy of gap measurement can be guaranteed by keeping each circular plate 2 in contact with the rubbing base 5. Furthermore, the diameters of the plurality of circular plates 2 increasing sequentially in a linear manner can further guarantee the measurement accuracy. For example, in practical application, the diameters of the plurality of circular plates 2 may be selected sequentially from small to large from 2.96 mm, 2.965 mm, 2.97 mm, 2.975 mm, 2.98 mm, 2.985 mm, 2.99 mm, 2.995 mm, 3.000 mm, 3.005 mm, 3.010 mm, 3.015 mm, 3.02 mm, 3.025 mm, 3.03 mm, 3.035 mm. During measurement, if a circular plate 2 just passes through a gap, the gap value of the gap can be determined as the diameter of that circular plate 2; and if the previous circular plate 2 is smaller than a gap and the next circular plate 2 is larger than the gap, the gap value of the gap can be determined as a intermediate value of the diameters of the two circular plates 2.

In the present embodiment, the circular plates 2 are made of rubber or metallic material. The rubber or metallic material has small friction coefficient, thus the circular plates 2 will not cause much wearing during measurement, ensuring accuracy of measurement.

Note that the "circular plate" herein refers to a shape that the thickness size thereof is much smaller than the diameter thereof. Alternatively, the circular plate as a rolling element can have a cylindrical shape. Obviously, the cylindrical rolling elements may have similar positional relationship as the circular plates in the above embodiment, and the only difference is that the diameter of the cylindrical rolling element is not necessarily larger than its thickness. With the large thickness of the cylindrical rolling elements, when the measurement portion moves along the longitudinal direction of the support rod 1, the circular side surface of the rolling elements can be kept perpendicular to the surface of the rubbing base 5, thereby the errors in measuring the gaps can be reduced.

In the present embodiment, the support portion further includes a plurality of rollers 3, the axes of the rollers 3 are connected to the support rod 1, the rollers 3 are capable of rotating about their axes respectively. The rollers 3 can cooperate with the support rod 1 to support the circular plates 2, preventing the circular plates 2 from wearing during measurement caused by the large number and large weights thereof.

The plurality of rollers 3 are arranged along the longitudinal direction of the support rod 1 with equal intervals, the portions of the rollers 3 to be in contact with the rubbing base 5 are arranged on a same plane as the portions of the circular plates 2 to be in contact with the rubbing base 5. By such arrangement, the edges of the circular plates 2 can be kept in contact with the rubbing base 5, so as to ensure accuracy of measurement, while the circular plates 2 can be supported by both the rollers 3 and the support rod 1, preventing the circular plates 2 from wearing during rolling.

In the present embodiment, the measuring tool further comprises a push rod 4, one end of the push rod 4 is connected to the end of the support rod 1 closing to a circular plate 2 having the maximum diameter, the push rod 4 can be elongated or shortened for pushing the support rod 1 to move. By providing the push rod 4, the operator can measure the gaps from remote distance, such that when the rubbing base 5 is large, the operator does not need to go onto the rubbing base 5 to measure the gaps, thus the contaminant to the rubbing base 5 due to access of operator can be avoided, and the error of gap measurement due to the weight of the operator on the rubbing base 5 can be avoided too.

In the present embodiment, one end of the push rod 4 is provided with a first connector, and a second connector is provided at the end of the support rod 1 closing to a circular plate 2 having the maximum diameter, the first connector and the second connector can be interconnected or disconnected. By providing the first connector and the second connector, the push rod 4 and the support rod 1 can be interconnected or disconnected freely. When the rubbing base 5 is large, those gaps at positions that an operator cannot reach only using the support rod 1, can be measured by assembling the push rod 4 onto the support rod 1; when the rubbing base 5 is small, the measurement can be performed without the push rod 4, then the push rod 4 can be detached. Therefore, the measurement is facilitated and the efficiency is improved.

The first connector and the second connector are magnets capable of attracting each other; or the first connector is a hook, and the second connector is a shackle adapted to the hook, that is, the hook and the shackle can be hooked together and detached from each other. Of course, the first connector and the second connector are not limited to above two forms, any assemblies that can be interconnected and disconnected are suitable.

Second Embodiment:

The present embodiment provides a measuring tool which is different from that in the first embodiment in that, the measuring portion includes a plurality of spheres having different diameters respectively, the centers of the spheres are connected with the support rod, and the spheres can rotate about their centers in any directions, such that the gap between the rubbing base and the rubbing roller can be measured by the diameters of different spheres.

The spheres can roll on the rubbing base, thus the at least one gap between the rubbing base and the rubbing roller can be measured successively. The rolling friction between the spheres and the rubbing base is smaller than the sliding friction between the measurement portion in prior art and the rubbing base, therefore the wearing of the surface of the rubbing base and damage to the surface of the rubbing roller caused by the measurement portion during measurement are significantly reduced, the accuracy of gap measurement is increased, and the rubbing quality of the orientation film is improved.

In the present embodiment, the spheres are arranged along the longitudinal direction of the support rod in a descending or ascending order of their diameters. As such, the gaps between the rubbing base and the rubbing roller can be successively measured by passing the spheres having different diameters in turn, without the need of frequent measuring using spheres having different diameters, thereby the measuring efficiency is increased. Moreover, the spheres are arranged in a line, such that when measuring each gap using the spheres, the measurement can be performed by moving the support rod along its longitudinal direction, the spheres will pass through the gap in sequence of their diameters from small to large. During the measurement, the spheres do not need to roll in other directions on the rubbing base, thus the rubbing base and the rubbing roller can be prevented from wearing.

In the present embodiment, the portions of the plurality of spheres to be in contact with the rubbing base are arranged on a same plane, and the diameters of the plurality of spheres increase sequentially in a linear manner. Since during measuring, the plurality of spheres are kept in contact with the rubbing base, and the gaps between the rubbing base and the rubbing roller are measured using the diameters of the spheres, the accuracy of gap measurement can be guaranteed by keeping each spheres in contact with the rubbing base.

The spheres may be made of the same materials as the circular plates in the first embodiment.

Other configurations of the measuring tool in the present embodiment are the same as those in the first embodiment, thus the details thereof are omitted here.

The first and second embodiments have the following beneficial effects: the measuring tools of the first and second embodiments, by providing a measuring portion capable of successively measuring at least one gap between the rubbing base and the rubbing roller, avoid frequent replacement of the measuring portion, thereby the measuring efficiency is increased greatly, and the utilization rate of processing equipment is improved. Moreover, wearing of the surface of the rubbing base and damage to the surface of the rubbing roller caused by the measurement portion during measurement are significantly reduced, the accuracy of gap measurement is increased, and the rubbing quality of the orientation film is improved.

According to the present invention, by providing a measuring portion capable of successively measuring at least one gap between the rubbing base and the rubbing roller, the frequent replacement of the measuring portion is avoided, thereby the measuring efficiency is increased greatly, and the utilization rate of processing equipment is improved.

It could be understood that, the above embodiments are merely exemplary embodiments adopted for describing the principle of the present invention, but the present invention is not limited thereto. Various modifications and improvements may be made by a person skilled in the art without departing from the spirit and essence of the present invention, and these modifications and improvements are considered to be within the protection scope of the present invention.

The invention claimed is:

1. A measuring tool, comprising a support portion and a measuring portion, wherein the measuring portion is movably connected to the support portion, the support portion is configured for supporting the measuring portion, and the measuring portion is configured for successively measuring at least one gap between a base and a workpiece on the base;

wherein the support portion includes a support rod, the measuring portion includes a plurality of rolling elements having different diameters, the rolling elements are connected to the support rod, and the rolling elements are capable of rolling on the base; and wherein the measuring tool further comprises a push rod, one end of the push rod is connected to one end of the support rod closing to a rolling element having a maximum diameter, and the push rod can be elongated or shortened for pushing the support rod to move.

2. The measuring tool of claim 1, wherein the rolling elements are circular plates having different diameters, the center of each circular plate is connected to the support rod.

3. The measuring tool of claim 1, wherein one end of the push rod is provided with a first connector, and a second connector is provided at the end of the support rod closing to the rolling element having the maximum diameter, the first connector and the second connector are interconnected or disconnected.

4. The measuring tool of claim 3, wherein the first connector and the second connector are magnets capable of attracting each other; or the first connector is a hook, and the second connector is a shackle adapted to the hook.

5. The measuring tool of claim 1, wherein the rolling elements are spheres having different diameters, the center of each sphere is connected to the support rod, and the spheres are capable of rotating about their center in any direction.

6. The measuring tool of claim 1, wherein the rolling elements have a cylindrical shape.

7. The measuring tool of claim 1, wherein the plurality of rolling elements are arranged along the longitudinal direction of the support rod in a descending or ascending order of their diameters.

8. The measuring tool of claim 1, wherein the centers of the plurality of rolling elements are arranged in a line.

9. The measuring tool of claim 1, wherein the portions of the plurality of rolling elements to be in contact with the base are arranged on a same plane.

10. The measuring tool of claim 1, wherein the diameters of the plurality of rolling elements increase sequentially in a linear manner.

11. The measuring tool of claim 1, wherein the plurality of rolling elements are made of rubber or metallic material.

12. The measuring tool of claim 1, wherein the support portion further includes a plurality of rollers, the axes of the plurality of rollers are connected to the support rod, the rollers are capable of rotating about their axes.

13. The measuring tool of claim 12, wherein the plurality of rollers are arranged along the longitudinal direction of the support rod with equal intervals, the portions of the rollers to be in contact with the base are arranged on a same plane as the portions of the rolling elements to be in contact with the base.

* * * * *